US009934551B2

(12) United States Patent
Fowler

(10) Patent No.: US 9,934,551 B2
(45) Date of Patent: Apr. 3, 2018

(54) SPLIT STORAGE OF ANTI-ALIASED SAMPLES

(71) Applicant: Advanced Micro Devices, Inc., Sunnyvale, CA (US)

(72) Inventor: Mark Fowler, Boxborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 10 days.

(21) Appl. No.: 15/282,336

(22) Filed: Sep. 30, 2016

(65) Prior Publication Data

US 2017/0018053 A1    Jan. 19, 2017

Related U.S. Application Data

(63) Continuation of application No. 13/186,256, filed on Jul. 19, 2011, now abandoned.

(60) Provisional application No. 61/365,703, filed on Jul. 19, 2010.

(51) Int. Cl.
*G09G 5/00* (2006.01)
*G06T 1/60* (2006.01)
*G06T 11/40* (2006.01)
*G06T 1/20* (2006.01)

(52) U.S. Cl.
CPC ............... *G06T 1/60* (2013.01); *G06T 1/20* (2013.01); *G06T 11/40* (2013.01); *G06T 2200/12* (2013.01); *G06T 2200/28* (2013.01)

(58) Field of Classification Search
CPC ..... G06T 1/60; G06T 15/405; G06T 2200/28; G06T 17/10; G06T 11/40; G06F 17/15; G01P 3/487; H04B 1/70752

USPC ........................................................ 345/611
See application file for complete search history.

(56) References Cited

U.S. PATENT DOCUMENTS

| 6,188,394 | B1 |   | 2/2001  | Morein et al. |
| 6,429,876 | B1 | * | 8/2002  | Morein .................. G06T 9/00 345/531 |
| 7,511,717 | B1 | * | 3/2009  | Bastos ................... G06T 11/40 345/426 |
| 7,564,456 | B1 |   | 7/2009  | Lindholm et al. |
| 8,325,203 | B1 | * | 12/2012 | Donham ................ G06T 11/40 345/611 |

(Continued)

FOREIGN PATENT DOCUMENTS

| WO | 2000/49576  A1 | 8/2000 |
| WO | 2007/066220 A1 | 6/2007 |

OTHER PUBLICATIONS

Deering, M. and Naegle, D.; "The SAGE Graphics Architecture", ACM Trans. Graph, vol. 21, No. 3, Jul. 1, 2002, pp. 683-692.

(Continued)

*Primary Examiner* — Gregory J Tryder
*Assistant Examiner* — Kwang Lee
(74) *Attorney, Agent, or Firm* — Volpe and Koenig, P.C.

(57) ABSTRACT

Embodiments of the present invention are directed to improving the performance of anti-aliased image rendering. One embodiment is a method of rendering a pixel from an anti-aliased image. The method includes: storing a first set and a second set of samples from a plurality of anti-aliased samples of the pixel respectively in a first memory and a second memory; and rendering a determined number of said samples from one of only the first set or the first and second sets. Corresponding system and computer program product embodiments are also disclosed.

20 Claims, 3 Drawing Sheets

(56) References Cited

U.S. PATENT DOCUMENTS

2002/0171656 A1   11/2002  Lavelle et al.

OTHER PUBLICATIONS

International Search Report and Written Opinion, dated Oct. 19, 2011, for PCT Application No. PCT/US2011/044563, 13 pages.

* cited by examiner

SPLIT STORAGE OF ANTI-ALIASED SAMPLES

CROSS REFERENCE TO RELATED APPLICATIONS

This application is a continuation of U.S. patent application Ser. No. 13/186,256, filed Jul. 19, 2011, which claims the benefit of U.S. Provisional Application No. 61/365,703, filed Jul. 19, 2010, which are incorporated by reference as if fully set forth.

FIELD OF INVENTION

Embodiments of the present invention are related to display of anti-aliased images.

BACKGROUND

Edge effects, such as jagged edges, in displayed images occur because real-world smooth edges are not accurately displayed in monitors. Monitors display pixels, which are discrete points on the screen. Edge effects can be visually unappealing. Therefore, anti-aliasing (AA) techniques are frequently utilized to reduce such edge effects. Supersampling and multisampling are two anti-aliasing techniques. In supersampling, the image is rendered in a higher resolution and a number of samples are stored per pixel. In multisampling, the original pixel is sampled in locations and the samples are stored per pixel. When rendering the image to be displayed, the actual pixel value can be determined by taking an average of the stored samples for that pixel. In 4.times. anti-aliased images, i.e., 4.times.AA images, 4 samples are taken for each pixel of an anti-aliased image. The samples may comprise color values, depth values, and/or other attributes relevant to displaying an image or scene.

The rendered images can be stored in graphics processor unit (GPU) memory, system memory, or other memory of the computer system. When anti-aliasing is enabled the memory footprint of an image increases substantially. For example, when 4.times.AA is being used, in general, each pixel requires four samples, thereby causing a substantial increase in the memory required to store the image. The increase in the required memory footprint can lead to performance degradations due to scalability limitations, bandwidth limitations, and delays in rendering frames. For example, in addition to the large memory footprint, accessing of multiple samples of the same image in memory can cause memory bandwidth congestion.

What are needed, then, are methods and systems that improve the utilization of memory bandwidth when anti-aliasing is used.

BRIEF SUMMARY OF EMBODIMENTS OF THE INVENTION

Embodiments of the present invention are directed to improving the performance of anti-aliased image rendering. One embodiment is a method of rendering a pixel from an anti-aliased image. The method includes: storing a first set and a second set of a plurality of anti-aliased samples of the pixel respectively in a first memory and a second memory; and rendering a determined number of said samples from the first set or the first and second sets.

Another embodiment is a system to render a pixel from an anti-aliased image. The system comprises: at least one processor; a first memory and a second memory coupled to the processor; and a split anti-aliased sample writer. The split anti-aliased sample writer is configured to store a first set and a second set of a plurality of anti-aliased samples of the pixel respectively in a first memory and a second memory. The system can also include a split anti-aliased sample reader. The anti-aliased sample reader can be configured to render a determined number of said samples from one of only the first set or the first and second sets.

Yet another embodiment is a computer readable media storing instructions wherein said instructions when executed are adapted to render a pixel from an anti-aliased image using at least one processor with a rendering method. The rendering method includes: storing a first set and a second set of a plurality of anti-aliased samples of the pixel respectively in a first memory and a second memory; and rendering a determined number of said samples from one of only the first set or the first and second sets.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the pertinent art to make and use embodiments of the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Anti-aliasing is performed to reduce edge effects in the display of images. Anti-aliasing of image frames, such as by supersampling or multisampling, generates a plurality of samples for each pixel of the image. In supersampling, the original image is rendered at a high resolution and several samples from the high resolution image are combined (or averaged) to render the image at the desired resolution. In multisampling, the pixel is sampled at several locations. For example, in 4.times.AA mutisampled image, 4 samples are taken of each pixel. Storing these multiple samples per pixel can become expensive both in terms of the memory footprint required to store the anti-aliased image as well as the additional memory traffic generated due to the retrieval of the multiple samples during the rendering of an image.

Furthermore, in the case of most pixels, only a few of the samples are actually used in rendering. Embodiments of the present invention are directed to organizing the anti-aliased samples in a manner to efficiently render images based on them. According to an embodiment, the anti-aliased samples of a pixel are stored in different memories. The different memories can have different storage and access characteristics. The samples to be stored in respective ones of the different memories can be selected based on, for example, the likelihood that a sample will actually be used in rendering an image. By storing only the most used samples in a local memory, such as graphics memory of the GPU, samples of more pixels can be accommodated within the graphics memory, thereby leading to an overall increase in speed of execution and reduction of memory traffic because, for example, the GPU can access all the image data required for the rendering in the local graphics memory.

In the following description, embodiments of the present invention are described primarily in relation to multisampling. Persons skilled in the art, however, would recognize that other methods of AA can also be used.

System to Split Storage of Anti-Aliased Pixel Samples

Figure 1:
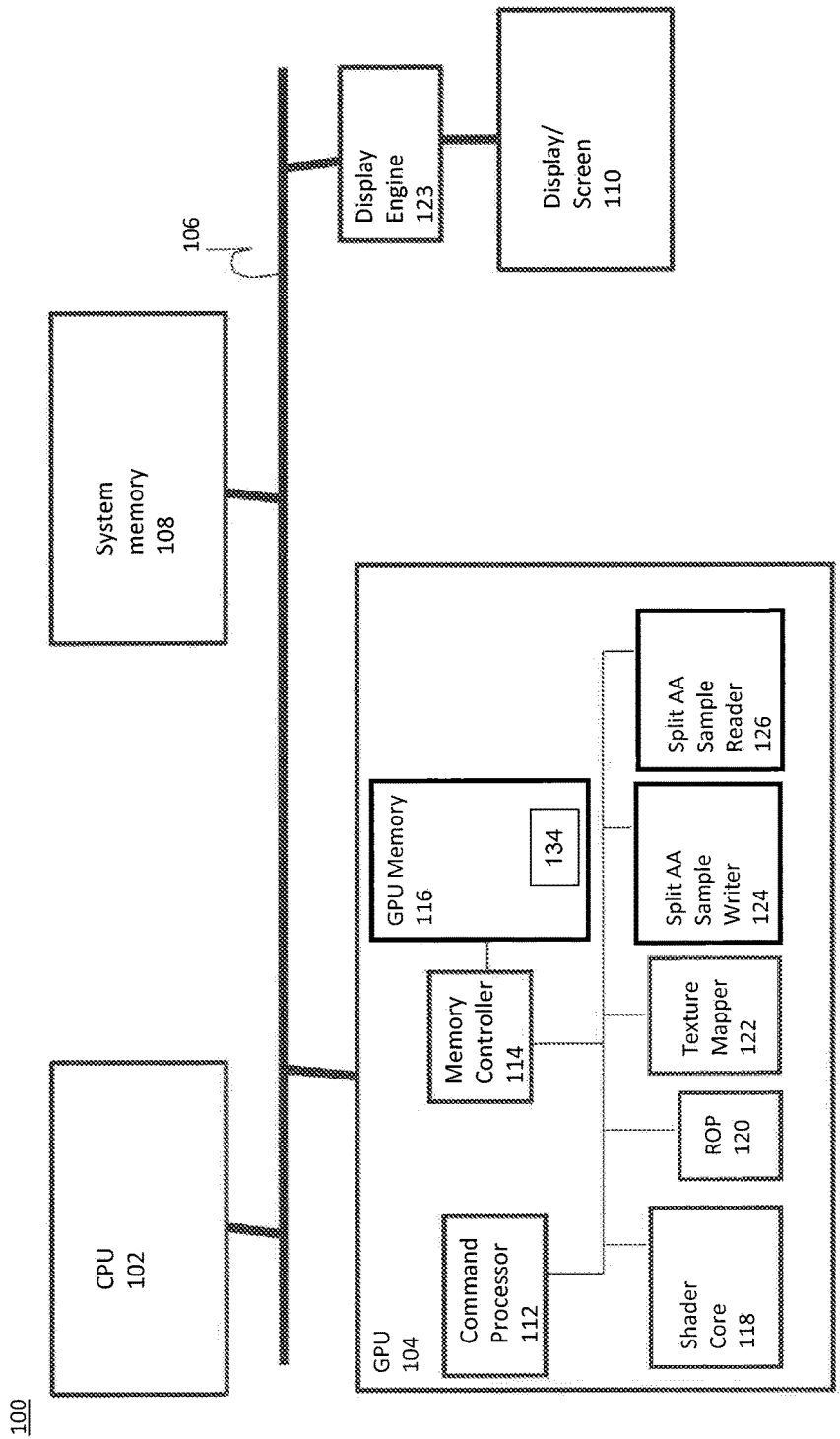
FIG. 1 shows a block diagram of a graphics computing environment according to an embodiment of the present invention.

FIG. 1 shows a computing environment according to an embodiment of the present invention. For example, computing environment 100 includes a central processing unit (CPU) 102 coupled to a GPU 104. As would be appreciated by those skilled in the relevant art(s) based on the description herein, embodiments of the present invention can include one or more GPUs shown. GPU 104 may be coupled to additional components such as memories, displays, etc. GPU 104 receives graphics related tasks, such as graphics processing (e.g., rendering) or display tasks, from CPU 102. As will be understood by those of ordinary skill in the art, GPU 104 may be, as illustrated, discrete components (i.e., separate devices), integrated components (e.g., integrated into a single device such as a single integrated circuit (IC), a single package housing multiple ICs, integrated into other ICs—e.g., a CPU or a Northbridge) and may be dissimilar (e.g., having some differing capabilities such as, for example, performance).

GPU 104 can include a command processor 112, a memory controller 114, local graphics memory 116, and a shader core 118. Command processor 112 controls the command execution on GPU 104. For example, command processor 112 can control and/or coordinate the receiving of commands and data from CPU 102 to be processed in GPU 104. Command processor 112 can also control and/or coordinate allocation of memory in graphics memory 116, in general through memory controller 114. Memory controller 114 can control access to graphics memory 116 for the reading and writing of data. In some embodiments, memory controller 114 can also arbitrate between system memory 108 and graphics memory 116, so that the data needed for processing can be obtained from either memory. Memory controller 114, shader core 118, and/or command processor 112 can have access to a memory mapping 134 that keeps track of pixel sample storage locations. Graphics memory 116 is, in general, a fast random access memory, such as, for example, embedded DRAM (EDRAM). In general, when compared to system memory, graphics memory 116 enables fast access to the GPU. Shader core 118 includes processing units which execute various processing tasks, such as graphics processing threads. For example, the processing units in shader core 118 can include a plurality of single instruction multiple data (SIMD) processing units. The graphics processing threads that execute on shader core 118 can include shader programs (sometimes also referred to as simply "shader") such as vertex shaders, geometry shaders, and pixel shaders. Other graphics processing threads such as rendering threads can also execute on shader core 118. Tasks to be executed in shader core 118 can be allocated by, for example, command processor 112.

According to an embodiment, GPU 104 can also include other modules, such as, a render operations block (ROP) 120, a texture mapper 122, a split AA sample writer 124, and a split AA sample reader 126. The logic of ROP 120, texture mapper 122, split AA sample writer 124, and split AA sample reader 126 can be implemented using a hardware, firmware, software, or a combination thereof. ROP 120 includes logic to render a screen to memory and/or other location. For example, ROP 120 can include logic to render an image to memory from the output of the pixel processing shaders. According to an embodiment, ROP 120 can invoke split AA sample writer 124 to write anti-aliased samples of pixels to a memory.

Texture mapper 122 includes logic to perform texture mapping and/or rendering of an image using the multi-sampled samples stored in memory. For example, texture mapper 122 can read the multisampled samples from memory in order to texture map a graphics object in order to depict various lighting effects. The reading of four separate samples from memory in the case of anti-aliased samples causes additional memory traffic compared to having to read only a single sample per pixel in the case of non anti-aliased case. Furthermore, many applications involve multiple passes of rendering and texture mapping, thereby leading to increased memory traffic. According to an embodiment, texture mapper 122 can invoke split AA sample reader 124 to read the multisampled samples that are stored in separate memories.

Figure 2:
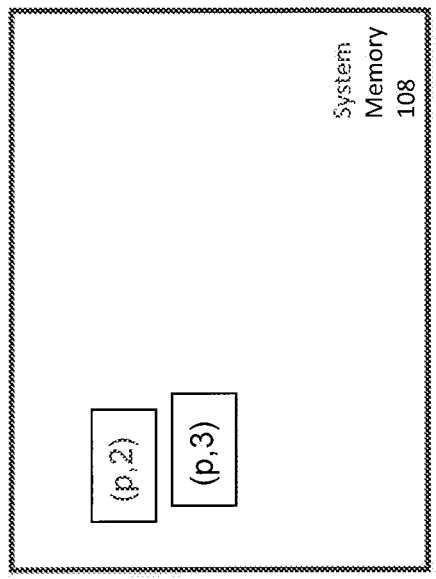
FIG. 2 shows an example allocation of multisampled pixel samples to memories according to an embodiment of the present invention.
Figure 2:
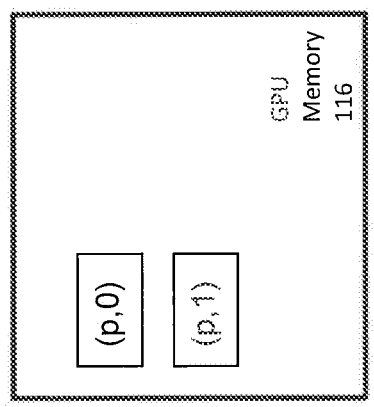

Split AA sample writer 124 includes logic to split the set of anti-aliased samples of each pixel before storing them in memory. The samples can be stored in system memory, in graphics memory, and/or in another memory. The samples can be stored in the different memories according to various storage schemes. Storing of the samples in graphics memory yields faster access to these samples when rendering and/or texture mapping. FIG. 2 illustrates an exemplary splitting of samples among memories applied to a set of anti-aliased samples. The storing of samples split among multiple memories is further described below with respect to FIGS. 2 and 3.

Split AA sample reader 126 includes logic to read the anti-aliased samples that are distributed among multiple memories. According to an embodiment, split AA sample reader 126 is configured to take a request for one or more pixel samples as input specifying a pixel identifier and optionally a sample identifier, and return the values corresponding to that one or more samples. Split AA sample reader 126 can be configured to read the samples by determining the number and location of the samples to be retrieved for rendering. Upon receiving a request for a pixel sample, split AA sample reader 126 can determine the number of samples to be read for the requested pixel and whether to retrieve the samples from the graphics memory and/or system memory. In some embodiments, the determination of how many samples are to be retrieved can be made on a pixel by pixel basis. In some embodiments, the determination of how many samples are to be retrieved is made per frame or at a higher level of granularity. Reading of the AA samples can be affected by the storage scheme according to which the samples are stored in memory. Reading of AA samples is further described in relation to FIGS. 2 and 3 below.

Computing environment 100 also includes a system memory 108. System memory 108 can be used for holding the commands and data that are transferred between GPU 104 and CPU 102. In some embodiment, system memory can also include sample storage 134. After the data is processed using graphics operations, the processed data can be written back to system memory by GPU 104. For example, in some embodiments, processed data from graphics memory 116 can be written to system memory 108 prior to be being used for further processing or for display on a screen such as screen 110. In some embodiments, frame data processed in GPU 104 is written to screen 110 through a display engine 109. Display engine 109 can be implemented in hardware and/or software or as a combination thereof, and may include functionality to optimize the display of data based upon the characteristics of screen 110. In another embodiment, display engine 109 can receive processed display data directly from GPU memory 116 and/or GPU memory 122.

The various devices of computing system 100 are coupled by a communication infrastructure 106. For example, communication infrastructure 106 can include one or more communication buses including a Peripheral Component Interconnect Express (PCI-E). Communications infrastructure 106 can also include, for example, Ethernet, Firewire, or other interconnection devices.

In the description above GPU 104 has been depicted as including selected components and functionalities. A person skilled in the art will, however, understand that one or both GPUs 104 can include other components such as, but not limited to, primitive assemblies, sequencers, shader export memories, registers, and the like.

FIG. 2 illustrates an example allocation of samples between two memories. According to an embodiment, the anti-aliased samples of pixels can be stored in the graphics memory 116 of the GPU and in system memory 108. For each pixel, the set of samples to be stored in each memory can be determined based on various criteria, such as, for example, the likelihood of the sample actually being used in rendering and/or how frequently the sample is likely to be used in rendering. According to an embodiment, the one or more samples that are most likely to be retrieved for rendering can be stored in the faster memory, such as GPU memory 116, and the other samples can be stored in a slower memory such as system memory 108. The example illustrated shows that of the four samples of pixel p, samples 0 and 1 (i.e., (p,0) and (p,1)) are stored in GPU memory 116 while samples 2 and 3 (i.e., (p,2) and (p,3)) are stored in system memory.

The samples allocated to each memory can be arranged according to any scheme, such as, for example, to improve speed of access and/or storage efficiency. According to an embodiment, the $0^{th}$ sample of respective pixels can be stored in contiguous memory blocks, followed by the $1^{st}$ sample of respective blocks, etc. An entire surface comprising samples of a specific sample position for all pixels can be stored in a contiguous memory area. The GPU memory can store surfaces for the $0^{th}$ and $1^{st}$ samples, and the $2^{nd}$ and $3^{rd}$ samples can be stored in system memory. Memory map 134 can include, for each surface, its base address and whether the surface is stored in GPU memory or system memory. The location of a particular sample, for example, the $1^{st}$ sample of pixel p can be determined based on the base address of the $1^{st}$ sample surface, and a stride. For example, actual position can be at an offset of stride multiplied by p from the base address of the $1^{st}$ sample, where the stride corresponds to the memory space occupied by one sample. By using a base address and a stride to access the respective stored samples, the amount of memory required for memory map 134 to store addresses of the sample locations is reduced when compared to storing separate addresses for respective sample locations.

In another embodiment, within each memory, all samples allocated to that memory from a pixel are stored in contiguous memory. For example, the $0^{th}$ and $1^{st}$ samples of each pixel may be stored in contiguous GPU memory and the $2^{nd}$ and $3^{rd}$ samples can be stored in contiguous system memory. In another embodiment, samples can be stored without any particular relationship in stored location to other samples. The samples in each memory can be stored and organized as most suitable to that memory. Addresses of the respective samples can be specified in memory map 134 in a manner that does not require the full address of each memory location to be stored in the memory map.

Method to Split Storage of Anti-Aliased Pixel Samples

Figure 3:
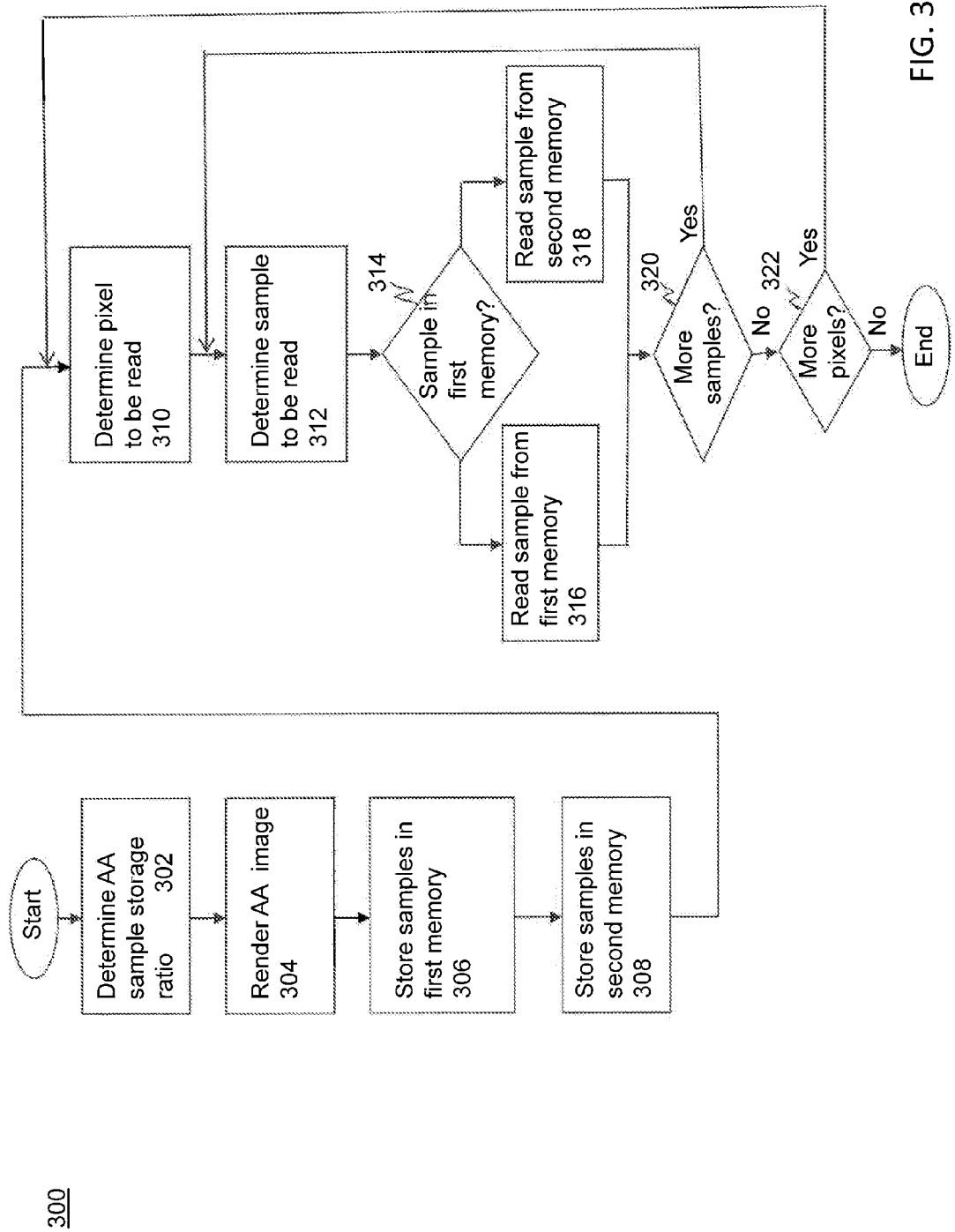
FIG. 3 is a flowchart illustrating the rendering of an anti-aliased image according to an embodiment of the present invention.

FIG. 3 is a flowchart illustrating a process to split the storage of respective anti-aliased samples of pixels among a plurality of memories according to an embodiment of the present invention. In step 302, the ratio according to which samples are to be stored in each memory is determined. According to an embodiment, the number of samples to be stored respectively in the GPU memory and in system memory is determined. The number of samples to be stored in the GPU memory can be determined based on various factors, such as, the size of the GPU memory, the sample size, the size of each surface, number of different images and/or screens for which surfaces are to be stored, and the like. In general, it is desirable to store, for each image and/or screen, the surfaces corresponding to the samples that are expected to be most frequently used. According to an embodiment, for each image and/or screen simultaneously in use, the $0^{th}$ and $1^{st}$ sample surfaces can be stored in GPU memory and the other samples can be stored in system memory.

In step 304, the AA image is rendered to memory. In an embodiment, a multisample anti-aliased image is rendered to memory by splitting the set of samples for each pixel between the GPU memory and the system memory according to a previously determined criteria such as the ratio determined in step 302. For example, the render target to which the ROP renders the image can be split between the GPU memory and system memory on the basis of the multisample sample identifier for each pixel.

In step 306, during the rendering of the image to memory, one or more multisample samples of each pixel of the image are rendered to respective surfaces in the GPU memory. The number of samples to be rendered to GPU memory can be determined according, for example, to step 302 above. It is preferred to store samples most frequently utilized for rendering and/or texture mapping in GPU memory, so that the respective samples can be efficiently accessed when those samples are accessed during one or more passes of rendering and/or texture mappings that occur in rendering the final image to a screen. The memory address to which the respective samples are rendered can be determined based, for example, upon the base address of the corresponding surface in GPU memory and the identifier of the pixel being rendered. For example, corresponding to each of the four samples generated in 4.times.AA multisampling a separate surface can be stored in GPU memory or system memory. The position within the corresponding surface of a sample from a specific pixel can be determined based upon the size of each sample and the numeric sequential identifier of the pixel.

In another embodiment, for each pixel, the number of samples stored in GPU memory can be the same as or different than the ratio determined in step 302 based on characteristics of that particular pixel. For example, an application can determine that specific parts and/or pixels of the image to be displayed are to be subjected to several passes of rendering and/or texturing, and therefore the samples of those pixels are to be stored in GPU memory. In an embodiment in which different numbers of samples can be stored for respective pixels, the storage of the samples and access to the stored samples can get more complex, but performance efficiencies may be gained. In yet another embodiment, one or more of the samples that are stored in system memory can also be stored in GPU memory for selected pixels. One or more surfaces comprising such selectively stored samples can be maintained in GPU memory, and a memory mapping function can be implemented to access such selectively stored samples as appropriate.

In step 308, during the rendering of the image to memory, one or more multisample samples of respective pixels of the image are rendered to the corresponding surfaces in system memory. The number of samples to be rendered to system memory can be determined according, for example, to step 302 above. The samples that are stored in system memory, as described previously, are preferably accessed less frequently than those stored in GPU memory. The memory address to which the respective samples are rendered can be determined based, for example, upon the base address of the corresponding surface in system memory and the identifier of the pixel being rendered. For example, as described above, corresponding to each of the four samples generated in 4.times.AA multisampling a separate surface can be stored in GPU memory or system memory. The position within the corresponding surface of a sample from a specific pixel can be determined based upon the size of each sample and the sequential numeric identifier of the pixel.

Steps 306 and 308 can occur sequentially or in parallel to store respective samples in the corresponding memories for each pixel of the image. At the conclusion of step 308, according to an embodiment, the multiple samples of each pixel for all pixels of the image are stored in the corresponding surfaces in GPU memory and system memory.

In step 310, a pixel to be read is determined. Reading of a pixel can occur during any one of the one or more passes of rendering and/or texture mapping that occur between the initial rendering of the multisampled anti-aliased render target (steps 304-308) and the display of the image on a screen. For example, a pixel can be read as part of a resolve operation to render a display image. Many applications execute multiple passes of rendering and texture mapping in order to render complex imagery and various effects such as lighting effects. According to an embodiment, during a rendering from the multisampled anti-aliased render target pixels of the image are read in a raster scan pattern going from left to right and top to bottom.

In step 312, the sample to be read for the selected pixel is determined. During rendering from the multisampled anti-aliased render target, for each pixel it can be determined what samples are to be used in rendering the display image. The number of samples to be displayed for the pixel can be determined, for example, based upon various criteria such as the number of objects touching the pixel, whether the pixel is covered by any single object, and the depth at which each object touches the pixel. For example, in 4.times.AA multisampling, if the pixel is covered entirely by a single object, only one sample need be read for rendering that pixel to the display image. If one object is touching the pixel, but not covering, then two samples can be read to render that pixel to the display image. Similarly, it can be determined whether to read three or four of the samples based upon the objects touching the pixel and the visibility of such objects.

In step 314, for each sample, it is determined whether the sample is in GPU memory or system memory. The determination as to in which memory the sample is located can be based on a previously determined parameter indicating the number of samples stored in GPU memory. For example, as determined in step 302, the $0^{th}$ and $1^{st}$ samples for any pixel can be accessed in GPU memory and the other samples can be accessed in system memory. In another embodiment, the determination can be based on dynamic criteria on a per pixel basis. For example, as described in relation to step 306 above, selected pixels can have different number of samples stored in GPU memory.

Based on the determination in step 314, the sample is accessed in either the GPU memory (in step 316) or in system memory (in step 318). The memory address in which the sample is located can be based on the base address of the surface corresponding to the sample and an offset within that surface. The base address for each surface may be preconfigured and/or predetermined at the time of allocation and/or writing of the samples to memory. The offset can be determined based on a known stride based on the size of a stored sample, and a numeric identifier identifying the pixel in the sequence of a raster scan access pattern. In another embodiment, the location for individual samples can be determined based on a memory mapping specifying the location of that sample in memory. For example, in embodiments in which a different number of samples can be stored for each pixel, a memory map can be used to identify the location of specific samples.

In step 320, it is determined whether more samples are to be stored in the render target. For example, in 4.times.AA multisampling, for each pixel, four samples can be stored in the render target. If more samples are to be stored, method 300 returns to step 312. If no more samples are to be stored for the current pixel, method 300 proceeds to step 322.

In step 322, it is determined whether the current pixel is the last pixel to be processed in method 300 in the current image. If yes, processing of method 300 is completed. If the current pixel is not the last one in the current image to be rendered to the render target, processing in method 300 returns to step 310.

Instructions executed by the logic to perform aspects of the present invention can be coded in a variety of programming languages, such as C and C++, Assembly, and/or a hardware description language (HDL) and compiled into object code that can be executed by the logic or other device.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein.

Aspects of the present invention can be stored, in whole or in part, on a computer readable media. The instructions stored on the computer readable media can adapt a processor to perform embodiments of the invention, in whole or in part.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for use in a graphics processing unit (GPU) for storing anti-aliased samples for each pixel in an image to memory, the method comprising:
   determining a number of samples to be stored in memory coupled to the GPU and a number of samples to be stored in system memory;
   splitting the anti-aliased samples for each pixel between the memory coupled to the GPU and the system memory;
   storing a set of anti-aliased samples for each pixel in the memory coupled to the GPU and storing a set of anti-aliased samples for each pixel in the system memory, wherein the set of anti-aliased samples stored in the memory coupled to the GPU is different than the set of anti-aliased samples stored in the system memory, wherein the set of anti-aliased samples stored in the memory coupled to the GPU are accessed more frequently for rendering the image than the set of anti-aliased samples stored in the system memory; and
   rendering the image using the stored sets of anti-aliased samples.

2. The method of claim 1 further comprising determining a ratio according to which the anti-aliased samples are to be stored in the memory coupled to the GPU and the system memory.

3. The method of claim 1, wherein the image is rendered using the stored sets of anti-aliased samples according to a predetermined sequence.

4. The method of claim 1, wherein the access speed of the memory coupled to the GPU is faster than the access speed of the system memory.

5. The method of claim 1 further comprising:
   determining the anti-aliased samples to be used to be used in rendering the image; and
   determining whether each sample is stored in the memory coupled to the GPU or the system memory.

6. The method of claim 1, wherein the rendering further comprises rendering the image using the stored set of anti-aliased samples stored in the memory coupled to the GPU optionally followed by using the stored set of anti-aliased samples stored in the system memory.

7. The method of claim 1, wherein the set of anti-aliased samples stored in the memory coupled to the GPU and the set of anti-aliased samples stored in the system memory are mutually exclusive.

8. A system for storing anti-aliased samples for each pixel in an image to memory comprising:
   a graphics processing unit (GPU);
   memory coupled to the GPU;
   system memory; and
   a split anti-aliased sample writer configured to:
      determine a number of samples to be stored in memory coupled to the GPU and a number of samples to be stored in system memory;
      split the anti-aliased samples for each pixel between the memory coupled to the GPU and the system memory;
      store a set of anti-aliased samples for each pixel in the memory coupled to the GPU and store a set of anti-aliased samples for each pixel in the system memory, wherein the set of anti-aliased samples stored in the memory coupled to the GPU is different than the set of anti-aliased samples stored in the system memory, wherein the set of anti-aliased samples stored in the memory coupled to the GPU are accessed more frequently for rendering the image than the set of anti-aliased samples stored in the system memory;
   wherein the GPU is configured to render the image using the stored sets of anti-aliased samples.

9. The system of claim 8, wherein the split anti-aliased sample writer is further configured to determine a ratio according to which the anti-aliased samples are to be stored in the memory coupled to the GPU and the system memory.

10. The system of claim 8, wherein the image is rendered using the stored sets of anti-aliased samples according to a predetermined sequence.

11. The system of claim 8, wherein the access speed of the memory coupled to the GPU is faster than the access speed of the system memory.

12. The system of claim 8 further comprising:
   a split anti-aliased sample reader configured to:
      determine the anti-aliased samples to be used to be used in rendering the image; and
      determine whether each sample is stored in the memory coupled to the GPU or the system memory.

13. The system of claim 8, wherein the GPU is further configured to render the image using the stored set of anti-aliased samples stored in the memory coupled to the GPU optionally followed by using the stored set of anti-aliased samples stored in the system memory.

14. The system of claim 8, wherein the set of anti-aliased samples stored in the memory coupled to the GPU and the set of anti-aliased samples stored in the system memory are mutually exclusive.

15. A non-transitory computer readable media storing instructions thereon, which, when executed by a graphics processing unit (GPU), are adapted to store anti-aliased samples for each pixel in an image to memory performing operations comprising:
   determining a number of samples to be stored in memory coupled to the GPU and a number of samples to be stored in system memory;
   splitting the anti-aliased samples for each pixel between the memory coupled to the GPU and the system memory;
   storing a set of anti-aliased samples for each pixel in the memory coupled to the GPU and storing a set of anti-aliased samples for each pixel in the system memory, wherein the set of anti-aliased samples stored in the memory coupled to the GPU is different than the set of anti-aliased samples stored in the system memory, wherein the set of anti-aliased samples stored in the memory coupled to the GPU are accessed more frequently for rendering the image than the set of anti-aliased samples stored in the system memory; and
   rendering the image using the stored sets of anti-aliased samples.

16. The non-transitory computer readable media of claim 15, wherein the operations further comprise determining a ratio according to which the anti-aliased samples are to be stored in the memory coupled to the GPU and the system memory.

17. The non-transitory computer readable media of claim 15, wherein the image is rendered using the stored sets of anti-aliased samples according to a predetermined sequence.

18. The non-transitory computer readable media of claim 15, wherein the operations further comprise:
   determining the anti-aliased samples to be used to be used in rendering the image; and
   determining whether each sample is stored in the memory coupled to the GPU or the system memory.

19. The non-transitory computer readable media of claim 15, wherein the rendering further comprises rendering the image using the stored set of anti-aliased samples stored in the memory coupled to the GPU optionally followed by using the stored set of anti-aliased samples stored in the system memory.

20. The non-transitory computer readable media of claim 15, wherein the set of anti-aliased samples stored in the memory coupled to the GPU and the set of anti-aliased samples stored in the system memory are mutually exclusive.

\* \* \* \* \*